Oct. 17, 1950 G. VAN I. WESTON 2,526,056
TIRE MEASURING DEVICE
Filed Nov. 27, 1945
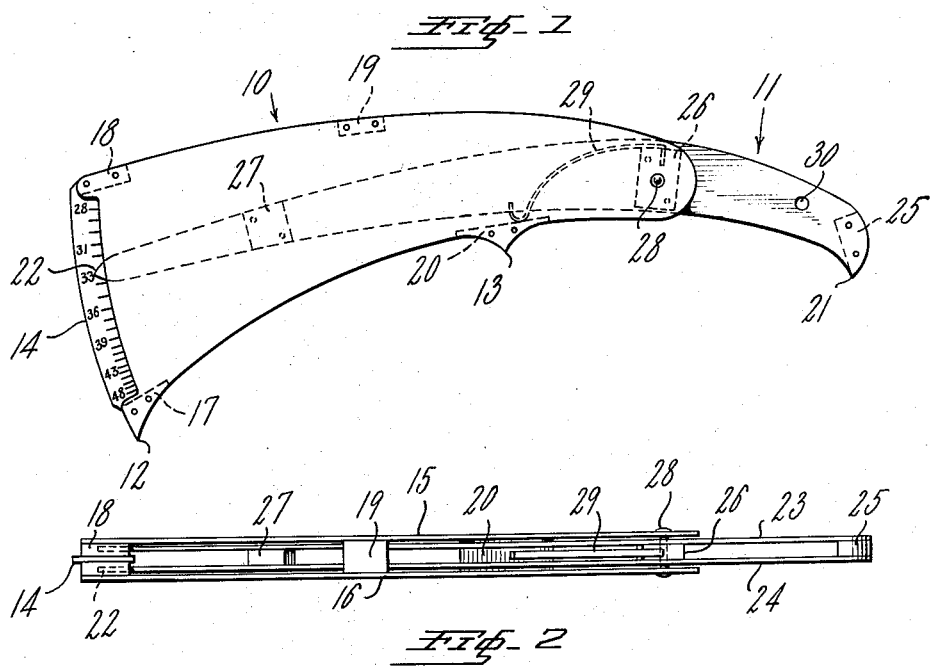
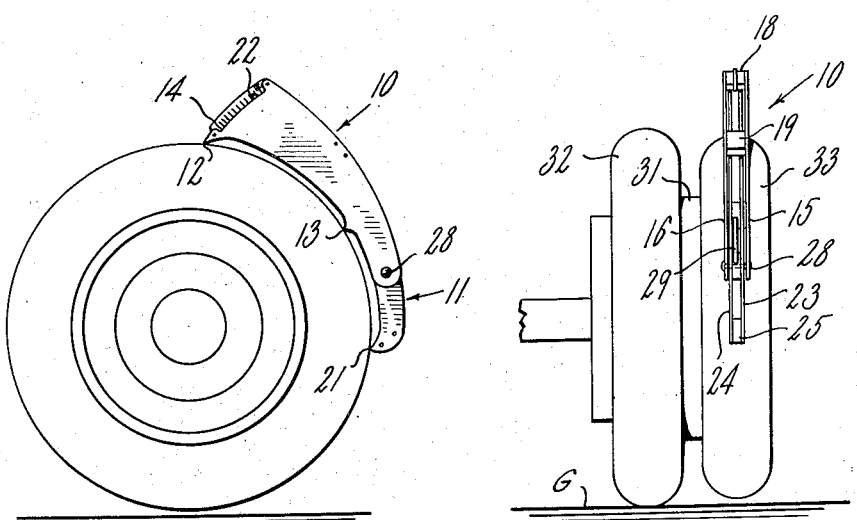
INVENTOR
GERRITT van I. WESTON
BY
Lester J. Bualong
ATTORNEY Patented Oct. 17, 1950

2,526,056

UNITED STATES PATENT OFFICE 2,526,056

TIRE MEASURING DEVICE

Gerritt van I. Weston, Ridgefield, Conn., assignor to United States Rubber Company, New York, N. Y., a corporation of New Jersey Application November 27, 1945, Serial No. 631,104

1 Claim. (Cl. 33—172)

This invention relates to an extremely simple apparatus for measuring the diameter of the tread of tires in the plane of the wheel.

The larger trucks and buses now traveling the highways are commonly provided with dual tires; that is two pneumatic tires for each rear wheel. It is extremely important that the two tires for the same wheel when properly inflated shall have the same diameter, for if one of the dual tires is only half an inch larger in diameter than the other, it will carry by far the greater portion of the load upon that wheel, and as a result will be subjected to excessive wear since it carries most of the load which should be borne equally by the two tires.

The importance of matching dual tires as to size has been stressed heretofore, and it has been proposed to use a tire diameter caliper adapted to span the tire and measure its size, but it is very difficult for one person alone to measure the diameter of a tire with a caliper because of the length of the same required to span a large tire. Furthermore the inner dual tire is more or less inaccessible, and in the case of buses both tires may be covered by a fender which prevents the use of such a caliper.

It has also been proposed heretofore to jack up a wheel of the vehicle equipped with dual tires and determine the size of each tire on that wheel by placing a steel tape around the periphery of the tread of one tire to measure its circumference, and then similarly measure the circumference of the other tire to determine how closely they are matched as to size, but this is a difficult and time consuming measuring operation.

The present invention contemplates an extremely simple and practical tire measuring device whereby the diameter of a tire may be determined by placing such device against the tread of the tire so that two spaced fixed points and a relatively moveable lever point will rest upon the surface of the tire, and then noting the position of a connected pointer relative to a scale graduated to give the tire diameter readings.

The construction and operation of the present tire measuring device will be more fully understood from the following description when read in connection with the accompanying drawing; wherein:

Fig. 1 is a side elevation of one embodiment of a tire measuring device such as contemplated by the present invention;

Fig. 2 is an edge view of the device of Fig. 1;

Fig. 3 is a side view of a tire having the tire measuring device of Fig. 1 in position thereupon to determine the size of the tire; and Fig. 4 is a rear view of a right rear truck or bus wheel equipped with dual tires, and showing the tire measuring device of the present invention in position to measure the size of the outer tire.

Truck and bus tires in dual use may range in size from about 28 to 48 inches in outside diameter of the tread. A single tire measuring device such as contemplated by the present invention and constructed as shown in the drawing may be used to determine the diameter of tires throughout this wide range, and such a measuring device may be less than two feet long. The measuring device shown in the drawing may be formed throughout of either metal or wood, or of other stiff material.

The present measuring device as shown in the drawing comprises an elongated body 10 having two spaced fixed tire engaging points and a scale graduated to give tire diameter readings, and a lever 11 having a tread engaging point at one end and a pointer at its other end. This lever is adapted to be pivoted to one end of the body 10 so that its pointer will travel over the scale disposed at the other end of the body.

The body 10 shown in the drawing is made hollow so that the pointer arm portion of the lever 11 may swing within the hollow casing formed by the body. This body 10 is so constructed that it has along one curved edge two spaced fixed tire engaging points 12 and 13 and it is narrow at one end to which the lever 11 is pivoted and wide at the other end so that this wide end will receive the relatively long curved scale 14 which is graduated to give tire diameter readings throughout the range of from 28 inches to 48 inches. This body 10 is conveniently formed of the side walls 15 and 16 of plywood that are maintained in spaced relation to each other by the spacing blocks, 17, 18, 19 and 20, and the narrower end of the body 10 preferably extends some distance beyond the fixed point 13 as shown.

The pivoted lever 11, has at one end the tire tread engaging point 21 and at the opposite end the pointers 22 disposed at the opposite sides of the scale 14 and adapted to cooperate with the graduations provided upon each face of this scale. The lever 11 as shown is made hollow to keep its weight down and comprises the side walls 23 and 24 of plywood maintained in spaced relation to each other by the blocks 25, 26 and 27. The lever 11 is pivotally secured to the body 10 by the pivot pin 28 so that the long pointer arm portion of this lever is housed within the hollow body 10.

It is desirable that the tire measuring device of the present invention be provided with yielding means for normally holding the pointer 22 at the end of the scale 14 having the lower reading. This is accomplished in the construction shown by providing the spring steel blade 29 one end of which is rigidly secured within the pivot block 26 of the lever 11 and the other end of this spring rests upon the block 20. This serves yieldingly to hold the pointer 22 at the upper end of the scale so that the pointer may swing downwardly over the scale when the tire measuring device is placed upon the tread of a tire as shown in Fig. 3 and is forced against the tire until the spaced points 12, 13 and 21 engage the tire tread. At this time the position the pointer 22 occupies with respect to the scale 14 will show accurately the diameter of the tire being measured. If desired the lever 11 may be formed with the hole 30 so that the measuring device may be hung on a nail when not in use.

As above stated the primary purpose of the present invention is to provide simple and practical means for determining whether or not dual tires are matched as to size. For example there is shown in Fig. 4 a truck or bus wheel 31 equipped with the dual tires 32 and 33, and as here shown the inner tire 32 is slightly larger than the outer tire 333, with the result that the inner tire at this moment is carrying the entire load as the outer tire does not contact the ground G. The fact that one dual tire is smaller than the other can be easily detected with the tire measuring device of the present invention by placing this device upon one tire as shown in Fig. 3 or 4 to determine the tire diameter reading, and then similarly determine the tire diameter reading of the other tire.

The proper graduation of the scale 14 may be worked out by geometry from the fact that the diameter of a circle can be determined if the angle is known that is subtended by two straight lines or cords of known length and which connect three points on the circumference of the circle. A simpler procedure for graduating the scale 14 is to draw circles on a flat surface having diameters ranging from 28 to 48 inches then place the measuring device shown in the drawing on the arc of each of these circles so that the points 12, 13 and 21 will touch the arc and mark where the pointer 22 falls for each circle.

It will be seen from the foregoing that in order to use the measuring device of the present invention it is necessary to have access to only a small portion of the tire circumference, and that one person can easily and quickly check the diameter of the dual tires being used on a truck or bus wheel.

Having thus described my invention, what I claim and desire to protect by Letters Patent is:

A tire measuring device for determining the size of a vehicle tire by engaging three spaced points on its tread surface, comprising an elongated hollow body formed of two stiff flat sheets secured in spaced relation to each other by several spacing blocks positioned therebetween and arranged to form two spaced fixed tread-engaging points, a flat scale graduated to give tire size readings secured at one end of said body in equally spaced relation between said sheets, a lever that is considerably longer than said body and having a tread-engaging point at one end and two spaced pointers at its opposite end, and means for pivotally securing the lever to the opposite end of the body from that provided with the scale and in the space between said sheets so that its pointers straddle and move over the scale and its tread-engaging point projects beyond the body to engage the tread at some distance from said fixed points.

GERRITT van I. WESTON.

REFERENCES CITED

The following references are of record in the file of this patent:

UNITED STATES PATENTS

| Number | Name | Date |
|---|---|---|
| 520,201 | Bath | May 22, 1894 |
| 825,911 | Koch | July 17, 1906 |
| 910,706 | Monton | Jan. 26, 1909 |
| 1,645,473 | Cash | Oct. 11, 1927 |
| 2,362,907 | Levin | Nov. 14, 1944 |

FOREIGN PATENTS

| Number | Country | Date |
|---|---|---|
| 329,516 | Great Britain | May 22, 1930 |